United States Patent [19]

Wald

[11] 4,405,668
[45] Sep. 20, 1983

[54] ONE PIECE BINDER-CARPET CONSTRUCTION

[75] Inventor: William Wald, Greenville, S.C.

[73] Assignee: Lewis J. McDermott, III, Cartersville, Ga.

[21] Appl. No.: 448,478

[22] Filed: Dec. 10, 1982

Related U.S. Application Data

[63] Continuation of Ser. No. 298,095, Aug. 31, 1981, which is a continuation of Ser. No. 112,952, Jan. 17, 1980, abandoned.

[51] Int. Cl.³ ............................................... B32B 3/00
[52] U.S. Cl. ........................................ 428/40; 428/62; 428/95; 428/247; 428/253; 428/343; 428/354
[58] Field of Search .................... 428/40, 62, 95, 247, 428/253, 343, 354

[56] References Cited

U.S. PATENT DOCUMENTS

| 3,014,829 | 12/1961 | Curtin | 428/40 |
| 3,560,319 | 2/1971 | Kuhlman | 428/40 |
| 4,075,377 | 2/1978 | Aitchison | 428/95 |
| 4,242,389 | 12/1980 | Howell | 428/40 |

Primary Examiner—Marion McCamish
Attorney, Agent, or Firm—Holland, Armstrong, Wilkie & Previto

[57] ABSTRACT

A pressure sensitive one piece carpet-binder construction for releasably adhering working pieces, such as carpets or similar articles, to holding surfaces, such as a floor substrate.

10 Claims, 10 Drawing Figures

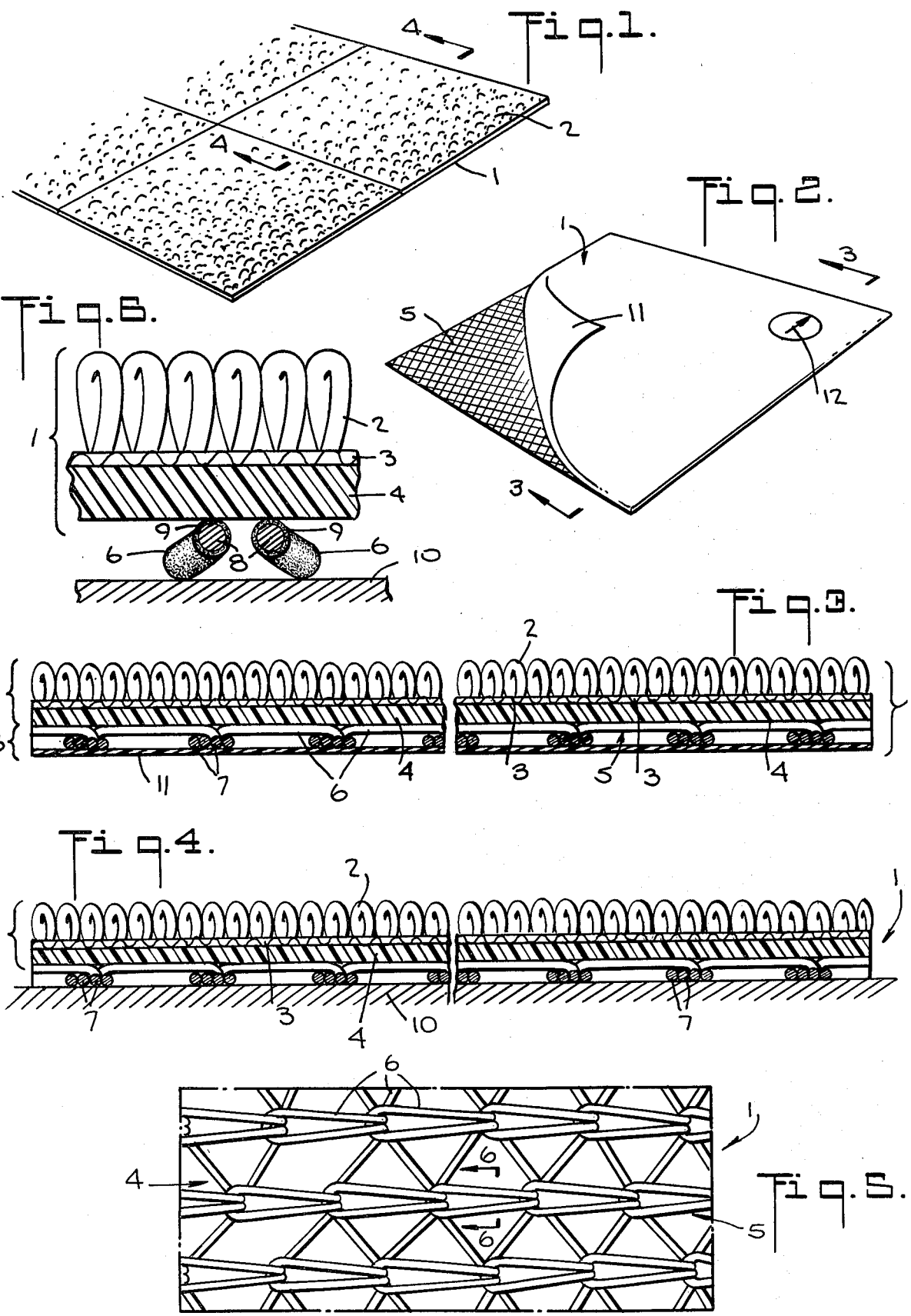

ONE PIECE BINDER-CARPET CONSTRUCTION

This application is a continuation of pending U.S. application Ser. No. 298,095 filed Aug. 31, 1981 which, in turn, was a continuation of Ser. No. 112,952 filed Jan. 17, 1980 now abandoned.

DESCRIPTION

This invention relates to work pieces, such as carpets and carpeting and, in particular, to work pieces which are affixed to a holding surface, such as a floor substrate.

In adhering work piece coverings, such as carpets or carpet tiles to support substrates, such as floor surfaces, an adhesive, having the properties of becoming tacky and curing to a hard bond, is applied to the floor. The carpeting pieces or carpet tiles are placed over the adhesive and moved into proper position before the adhesive becomes too tacky to work. The adhesive is then permitted to dry hard and adhere the carpeting in a fairly permanent bond to the floor. Removal of the carpet after a length of time is difficult because the backing material is strongly adhered to the floor. Removal causes the backing to tear with parts remaining on the floor and the adhesive which is bonded to the floor remains thereon and is difficult to take off.

In order to avoid this, there has been provided a release adhesive binder with a grid construction which is interposed between the floor and the carpeting for reducing the total adhesive area contact with both the floor and the carpet. This is described in pending U.S. patent application Ser. No. 688,943 filed May 24, 1976, now U.S. Pat. No. 4,234,649 the entire disclosure of which is incroporated herein by reference.

The binder material of said earlier development is either in separate sheet or ribbon form and the strands thereof are coated with pressure sensitive release adhesive which permits the binder together with the carpet which lays over it to be easily removed from the floor without marring the floor. The carpeting is firmly anchored to the floor while the release characteristics of the binder allows proper seam adjustment and abutment by permitting easy lifting of the carpet from the binder during installation. It has been found that such a binder material will remain on the floor for long periods of time and can be removed without unduly marring the floor or causing the carpet to be torn.

The present invention is an improvement over said earlier structure and has for one of its objects the provision of a one piece binder-carpet construction.

Another object of the present invention is the provision of an improved one piece binder-carpet construction in which the binder portion is permanently adhered to and included in the lower surface of the carpet portion.

Another object of the present invention is the provision of an improved one piece binder-carpet construction in which the binder portion is not adapted to be separated from the carpet portion when the carpet is applied or removed from the floor.

Another object of the present invention is the provision of an improved one piece binder-carpet construction in which the carpet portion and the binder portion are substantially permanently adhered together at the time the carpet material is cut into tile to form carpet tile.

Another object of the present invention is the provision of an improved one piece binder-carpet construction in which the binder portion is substantially permanently adhered directly to the primary backing of the carpet portion.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view of a one piece binder-carpet construction made in accordance with the present invention.

FIG. 2 is a perspective view of the present invention showing the manner of removing the protective covering from the binder-carpet construction of the present invention.

FIG. 3 is an inverted sectional view taken along line 3—3 of FIG. 2.

FIG. 4 is a sectional view taken along line 4—4 of FIG. 1.

FIG. 5 is a bottom view of the binder-carpet construction of the present invention.

FIG. 6 is an enlarged sectional view taken along line 6—6 of FIG. 5.

Figure 7:
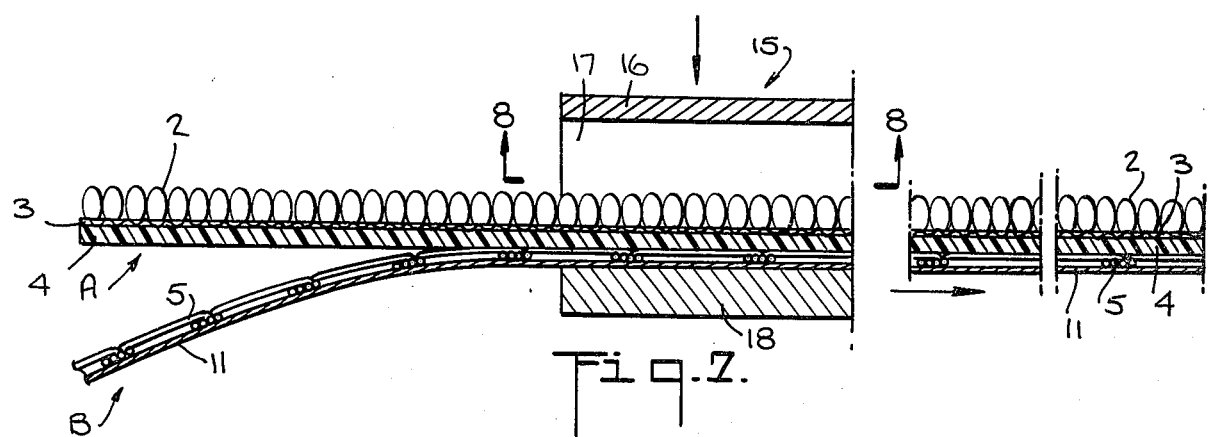
FIG. 7 is a diagrammatic sectional view showing the manner in which the carpet portion and the binder portion are adhered together to make a unitary carpet tile.

Referring more particularly to the drawings, the present invention comprises a combined binder-carpet construction 1 which includes a carpet portion A and a binder portion B substantially permanently adhered together.

The carpet portion A comprises the usual pile 2, which may be cut or uncut and which may be tufted, woven or otherwise made and which is embedded, supported or anchored to a primary backing layer 3, which may be a woven or nonwoven material. Beneath the primary backing layer 3 and permanently adhered thereto is a secondary backing layer 4 which is or may be made of resilient material such as foam rubber, a fabric of jute or woven synthetic or a plain rubber or plastic coating.

Embedded and permanently mounted to the underside of the carpet portion A is the binder portion B which comprises a binder 5 and a removable protective release backing 11. The binder 5 is preferably comprised of strands 8 of a natural or synthetic fiber stock (such as paper), which is woven, knit or otherwise fabricated into a grid-like or other suitable construction. It will be understood that the binder 5 may be made from any other suitable material.

The binder 5 forms a plurality of spaced frame elements 6 and a plurality of foot or rib portions 7. These foot or rib portions 7 are adapted to space the frame elements of the binder 5 slightly away from the floor 10.

The strands 8 of the binder 5 are coated with a pressure release adhesive 9 as shown in FIG. 6.

The binder 5 has an upper face which is adhered to the lower face of the backing 4 of the carpet portion A and a lower face which is adhered to a floor 10. By reason of adhesive and the intense pressure applied, the upper face of the binder 5 is embedded and substantially permanently mounted to the lower face of the backing 4. The adhesive between the upper face of binder 5 and the lower face of backing 4 is substantially permanent to form a strong bond (as will be more fully discussed below) so that in effect the binder portion B and the carpet portion A becomes one piece.

The pressure release adhesive 9 which is on the lower face of the binder 5 permits the binder 5 to be securely anchored to the floor 10 while permitting the binder-carpet structure to be easily lifted therefrom.

With this structure, after the release backing 11 is removed to expose the adhesive coated binder 5, the binder-carpet construction may be placed on the floor 10 with the release adhesive 9 on the lower face of the binder 5 resting on the floor to adhere the entire binder-carpet construction to the floor 10. Because the foot or rib portions 7 of binder 5 bear on the floor 10 and the frame elements 6 of the binder 5 are slightly above the floor, the binder 5 is only lightly adhered to the floor 10. The adhesion is sufficient to form a secure bond so that it will not come up under normal wear but will be light enough so that the work piece may be easily removed without tearing or marring the floor.

When the carpet portion A is to be removed, the binder 5 is lifted from the floor 10 and since it is a unitary structure with the carpet portion A, the entire binder 5 together with the carpet portion A, with which it is integral, will be removed. Excessive amounts of pressure release adhesive 9 on binder 5 will not remain on the floor 10 and pieces of the pile 2 or backing 3 or 4 will not remain on the floor so that the floor 10 is relatively clean after the structure is removed.

In order to protect the adhesive 9 on the binder 5 and prevent the adhesive 9 from permanently adhering to other carpets or articles, a release layer 11, which may be a thin polyethylene sheet, is mounted over the binder 5 until the carpet is to be used. This release layer 11 may have an arrow 12 thereon showing the direction of the weave to act as a guide so that the carpet is installed in the proper manner.

Figure 8:
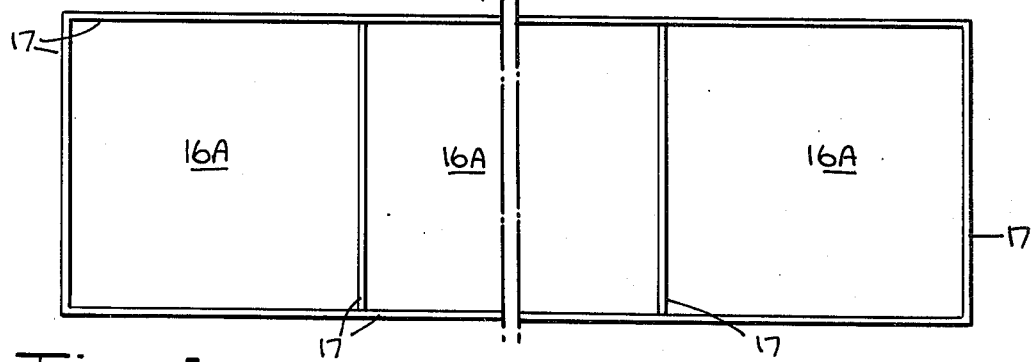
FIG. 8 is a sectional view taken along the line 8—8 of FIG. 7.

The preferred method of forming the one piece binder-carpet construction is shown in FIGS. 7 and 8, and comprises pressing the carpet portion A and binder portion B together under high pressure so that the adhesive 9 on the upper face of the binder 5 is securely embedded and adhered to the undersurface of the backing 4. As shown in FIGS. 7 and 8, the perferred way of making the binder-carpet construction for use in connection with tile is to apply pressure during the carpet cutting operation. The carpet portion A is moved under a cutter mechanism 15 having a movable pressure plate 16 divided into pressure squares 16A and a plurality of knives are provided around the periphery of each square 16A of the pressure plate 16. The binder portion B is placed on a support plate 18 which is spaced below the pressure plate structure 16 which has means to accommodate the knives 17 when the pressure plate 16 is lowered. The carpet portion A and the binder portion B may be fed from a roll (not shown).

When the binder portion A and the carpet portion B are in position under the cutter mechanism 15, the cutter-pressure plate 16 is depressed so that the knives 17 cut the carpet and binder portions into squares. The extent of the thrust of the cutter plate 16 is such that each pressure square 16A will apply pressure to the carpet and binder portions A and B and tightly squeeze the two together between squares 16A and plate 18. The pressure is such that the adhesive 9 on the strands 8 of the binder 5 will adhere strongly and be embedded into the secondary backing 4 in a substantially permanent relationship to form a one piece structure.

It will be understood, of course, that the square configuration of pressure plate knives 17 shown in the drawings is to illustrate the invention when the carpet tiles are made. The shape of the knives 17 to form the combined structure may be changed to form any desired shape without departing from the invention.

The pressure applied to the binder portion B and the carpet portion A is sufficient to strongly adhere and embed the binder 5 to the secondary backing material 4 into a substantially permanent one piece structure. This can be accomplished without heat. However, it is within the purview of the invention to use heat to adhere the binder and carpet portions together to form a strong bond. In this connection, the heat may be applied to the binder portion and the carpet portion and/or heat may be applied to the cutter pressure plate mechanism 15, if desired.

Figure 9:
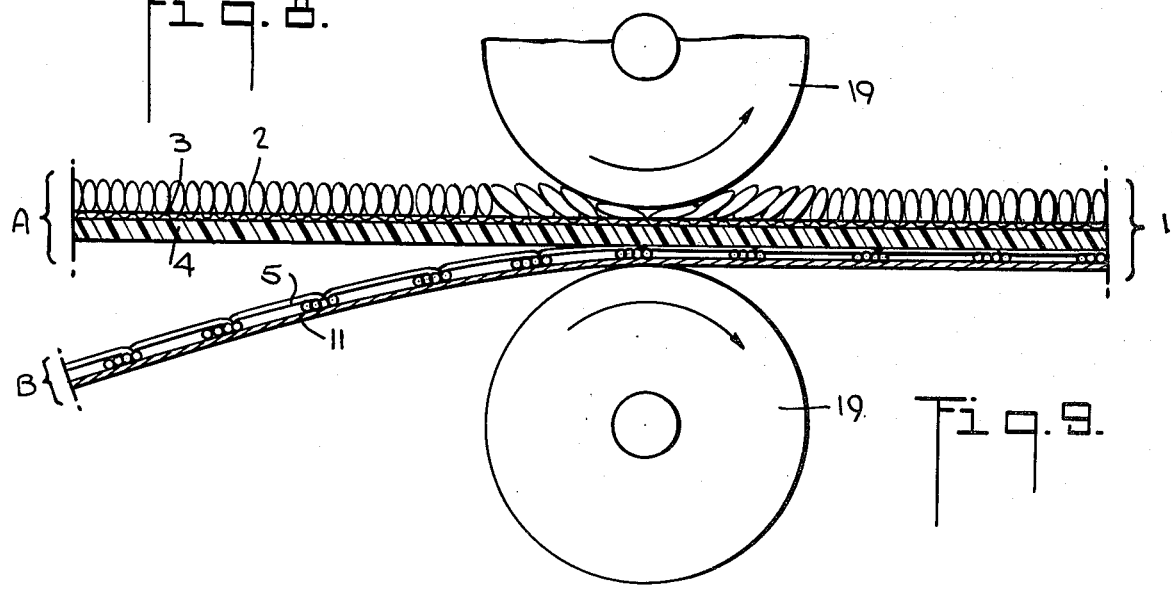
FIG. 9 is a diagrammatic sectional view showing the manner of making rolls of carpeting with the present invention.

FIG. 9 shows a method of forming a similar binder-carpet construction for broadloom widths, rather than individual tiles as in FIGS. 7 and 8. In this instance, the carpet portion A comprising pile 2, a primary and secondary backings 3 and 4 and the binder structure B comprising binder 5 and release cover 6 are both moved beneath a pair of pressure rollers 19. The pressure rollers 19 apply sufficient pressure to the two structures so that the binder 5 is strongly adhered to and becomes embedded in the lower face of the secondary backing material 4 to form a substantially permanent one piece structure. Again this system may be performed without the application of heat, the pressure being sufficient to strongly adhere the binder to the backing. However, again, heat can be applied either to the portions A or B and/or to the rollers 19 if desired.

Figure 10:
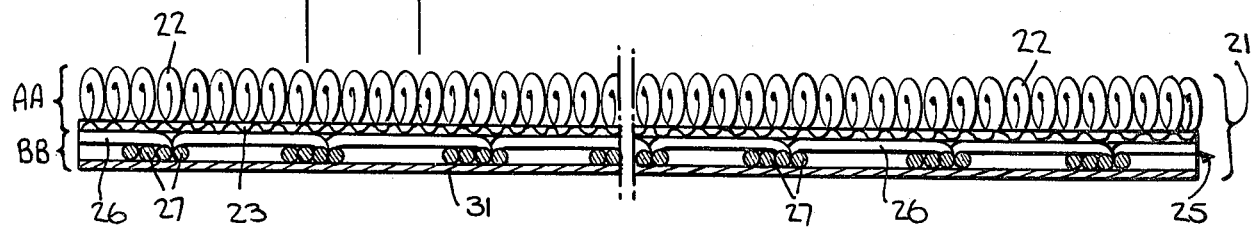
FIG. 10 is a sectional view similar to FIG. 3 showing a modification of the present invention.

FIG. 10 shows the present invention in connection with carpet construction 21 in which the carpet portion AA does not have a secondary backing material such as the backing material shown in FIG. 3. The binder 25 of the binder portion BB is applied directly to the primary backing layer 23 in which the pile 22 is anchored by a latex coating. The spaced frame elements 26 and the ribs 27 of the binder 25, as well as release layer 31, operate in the same manner as the structure shown and described in FIGS. 1 to 6.

With the binder-carpet construction (whether tile or broadloom with or without secondary backing 4) made in accordance with the invention is to be used, the release backing 11 is removed to expose the adhesive coated binder layer 5. The lower surface of the binder is applied to the floor 10. The arrow on the backing 11 will indicate to the installer the direction of the weave of the pile 2 so that carpet may be installed in the proper manner. If it is necessary to adjust the carpet during the installation, the pressure release adhesive 9 on the lower face of the binder 5 will permit the carpet to be easily lifted and readjusted.

After the carpet has been down for any length of time and it is desired to lift it, it is merely necessary to lift the edge of the unitary structure and pull the binder 5 upwardly. The binder 5 will carry with it the entire one piece carpet structure. Since the binder 5 is attached to the backing 4 (or 23 if the structure used is similar to the one shown in FIG. 10), in a substantially permanent manner, lifting the binder 5 will lift the entire binder together with the carpet portion which it supports so that the entire binder-carpet construction will be lifted.

Since the only points of adherence to a floor substrate 10 is the release adhesive 9 on the binder 5, the lifting of the binder-carpet construction will leave the floor 10 unmarred and, in addition, since the binder 5 is a unitary structure, it will not cause the backing material 4 of the carpet to become affixed to the floor or be torn, etc.

The pressure sensitive installation system described herein can be used during the processing of all types of carpeting, as well as wood tiles, ceramic tiles and resilient floor covering materials. In carpets, this would include those items to which sponge rubber, foam rubber, vinyl (foam or solid), polyethylene, jute, or clear latex tie-coat represents the backing system. Carpet products can be in the form of tiles, area rugs, bath mats, broadloom in varying widths which can be woven, knitted, tufted, fusion bonded, needlepunch, etc. The invention can also apply to resilient coverings, such as vinyl asbestos, tiles, and vinyl sheet goods, etc. Wood flooring components, particularly wood tile or parquet sections, as well as ceramic tile, would also be used with the invention.

In all of these cases, the advantages are ease and economy of installation and ease of removal from the floor substrate without the use of special equipment and without leaving a residue from the carpet, resilient floor covering or an adhesive system on the floor. In other words, the present invention provides a self-adhering component with its own integrity which can be substituted for the conventional glues or tackless installation systems normally required at present.

This invention withstands the most rigorous of exposures, including heavy foot traffic, wheeled vehicles, castered desk chairs, and combinations of these while still retaining the ability to strip cleanly from the plywood, cement and vinyl floor substrates to which they were applied. The system retains its functionality after extremes of heat or cold exposure and is even capable of withstanding wet conditions with the bond re-established (if it fails) on drying. Normal maintenance procedures such as vacuuming, shampooing, etc. have little or no deleterious effect on it.

In addition to conventional flat floor surfaces, the invention has potential applicability in a variety of tangential applications such as wall coverings, pictures, wall tapestries, place mats, ceiling tiles, and the like. Another very important application could be in the areas such as automotive interiors where carpets, door panels, headliners and even truck liners of stretchable fabrics could be molded and adhered simultaneously. There might even be potential in the upholstery field where lighter weight fabrics and dimensionally unstable fabrics could be held in place and easily removed from cushioning systems.

It will thus be seen that the present invention provides a one binder-carpet construction in which the binder portion is permanently adhered to the lower surface of the carpet portion and which will not separate from the carpet portion when the carpet is removed from the floor. The present invention also provides an improved one piece carpet and binder construction in which the carpet and binder are substantially permanently adhered together at the time the carpet material is cut into predetermined portions.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A combined cover-binder unit for strippable attachment to a rigid holding surface comprising a cover portion, said cover portion having an upper face and a lower face, said lower face including a backing layer, a binder portion beneath the lower face of the cover portion, said binder portion comprising a binder material having an upper surface and a lower surface, and comprising a plurality of spaced frame elements which intersect each other to form a grid-like construction, the entire surfaces of said spaced frame elements of the said binder material being coated with an adhesive coating, the entire upper surface of the binder material being substantially permanently adhered to the entire lower face of the cover portion by said adhesive, the space between said spaced frame elements being devoid of adhesive so that the areas of the lower face of the cover portion not adhered to said binder portion are exposed areas, the adhesive on said lower surface of the binder material being of the pressure-sensitive type, the lower surface of the binder material being adapted to be removably adhered to a rigid holding surface by said pressure-sensitive adhesive, the entire binder material extending over the entire area of the lower face of said cover portion, and the exposed areas of said lower face of said cover portion between said spaced frame elements being devoid of adhesive whereby they are not adhered to said rigid holding surface, said cover portion comprising a carpet having a pile and a backing layer permanently attached therebeneath and wherein the binder material is permanently embedded and adhered to the underside of said backing layer.

2. A unit as claimed in claim 1 wherein said binder material is comprised of filaments coated with a pressure sensitive adhesive with the upper surface substantially permanently bonded to the lower face of the cover portion.

3. A unit as claimed in claim 2 wherein the binder material has ribs extending therefrom which ribs are adapted to rest on the rigid holding surface.

4. A unit as claimed in claim 3 wherein the binder material comprises woven, knitted or otherwise fabricated material with the loops forming ribs.

5. A unit as claimed in claim 4 wherein said binder material has a removable protective release backing layer over its lower surface.

6. A unit as claimed in claim 5 wherein the backing layer of said carpet comprises a primary backing layer permanently mounted beneath said pile and a secondary backing layer permanently attached beneath said primary backing layer and wherein the said binder material is attached to the lower surface of the said secondary backing layer.

7. A unit as claimed in claim 6 wherein the release backing has an arrow thereon showing the direction of the weave.

8. A unit as claimed in claim 7 wherein said binder material is made out of paper which is coated with pressure sensitive adhesive.

9. A unit as claimed in claim 7 wherein said cover-binder unit is in the shape of a cut tile.

10. A unit as claimed in claim 7 wherein said cover-binder unit is in the shape of a continuous broadloom.

* * * * *